No. 684,960. Patented Oct. 22, 1901.
S. B. TURNER.
MECHANICAL MUSIC CHART.
(Application filed Mar. 27, 1901.)
(No Model.) 2 Sheets—Sheet 1.
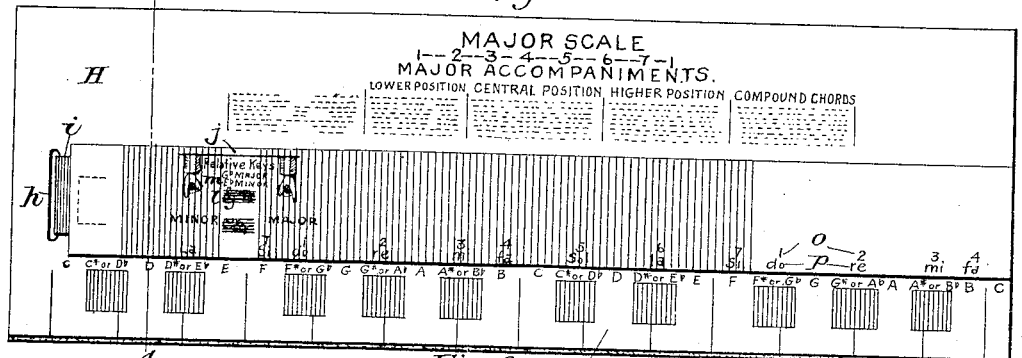
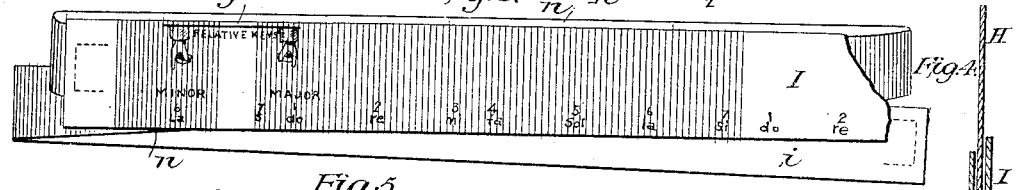
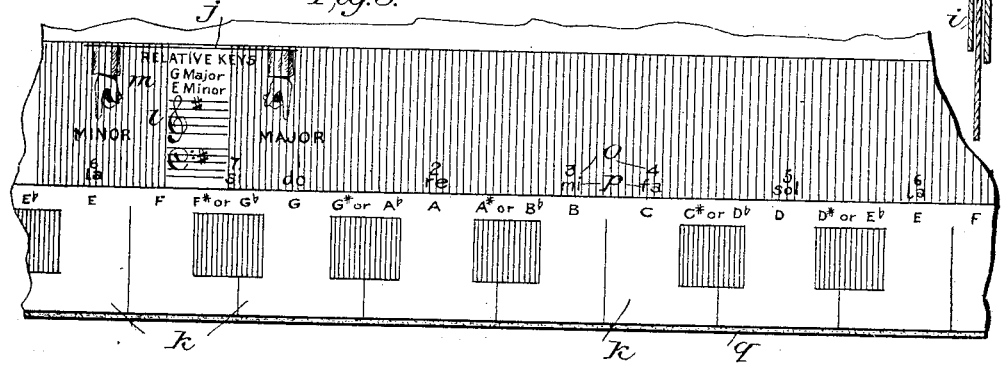
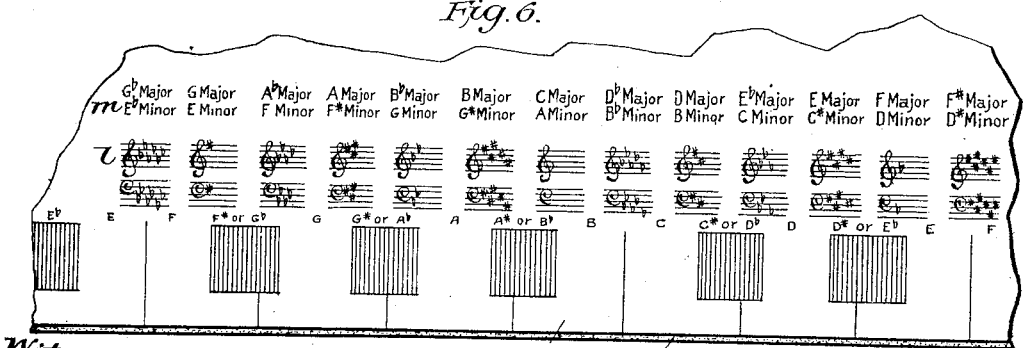
Witnesses: Inventor: Samuel B. Turner.

No. 684,960. Patented Oct. 22, 1901.
S. B. TURNER.
MECHANICAL MUSIC CHART.
(Application filed Mar. 27, 1901.)

(No Model.) 2 Sheets—Sheet 2.

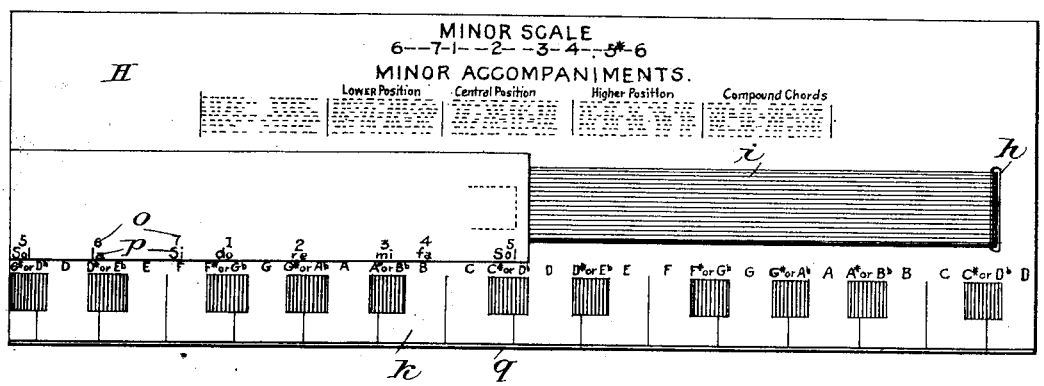

Fig. 2.

Fig. 7.

MAJOR SCALE
1--2--3-4--5--6--7-1
MAJOR ACCOMPANIMENTS.

|  | Lower Position | Central Position | Higher Position | Compound Chords |
|---|---|---|---|---|
| Tonic Chords | 5¹ 1₁ 3₃ 5₅ | 5¹ 3₁ 5₂ 1₅ | 5¹ 5₁ 1₃ 3₅ | 5¹ 1¹ 1₁ 3₃ 5₅ |
| Dominant " | 1₅ 7 2₂ 5 | 1₅ 2 5₂ 7 | 1₅ 5 7₂ 2 | 5 5 7 2₂ 5 |
| Subdominant" | 2₄ 1 4₃ 6 | 2₄ 4 6₃ 1 | 2₄ 6 1₂ 4 | 4 4 1 4₃ 6 |
| Sixth " | 3₃ 1 5₂ 1 | 3₃ 1 5₂ 1 | 3₃ 5 1₂ 5 | 1₃ 1 5₂ 1 |
| Tonic 6/4 " | 5¹ 1 4₃ 6 | 1 4 6₃ 1 | 1 6 1₂ 4 | 1 1 1 4₃ 6 |
| Dominant 6/4." | 1₅ 1 3₃ 5 | 1₅ 3 5₂ 1 | 1₅ 5 1₃ 3 | 5 5 1 3₃ 5 |
| Dominant 7ᵗʰ " | 5₅ 7 2₂ 4₄5 | 5 5 2 4₂ 5₃7 | 5 5 5 7₂ 2₃4 | 5 5 7 2₂ 4₄5 |
| Tonic " | 1 1 3 5 | 1 1 3 5 1 | 1 1 5 1 3 | 1 1 1 3 5 |

Fig. 8.

MINOR SCALE
6--7-1-2-3-4--5#-6
MINOR ACCOMPANIMENTS.

|  | Lower Position | Central Position | Higher Position | Compound Chords |
|---|---|---|---|---|
| Tonic Chords | 5₆ 6₁ 1₃ 3₅ | 5₆ 1₁ 3₂ 6₅ | 5₆ 3₁ 6₃ 1₅ | 5₆ 1₆ 6₁ 1₃ 3₅ |
| Dominant " | 1₃ 5# 7₂ 3 | 1₃ 7 3₂ 5# | 1₃ 3 5#₂ 7 | 3 3 5# 7₂ 3 |
| Subdominantⁿ | 2₂ 6 2₃ 4 | 2₂ 2 4₃ 6 | 2₂ 4 6₂ 2 | 2 2 6 2₃ 4 |
| Sixth " | 3₁ 6 3₂ 6 | 3₁ 6 3₂ 6 | 3₁ 3 6₂ 3 | 1₁ 6 3₂ 6 |
| Tonic6/4 " | 5₆ 6 2₃ 4 | 6 2 4₃ 6 | 6 4 6₂ 2 | 6 6 6 2₃ 4 |
| Dominant6/4 " | 1₃ 6 1₃ 3 | 1₃ 1 3₂ 6 | 1₃ 3 6₃ 1 | 3 3 6 1₃ 3 |
| Dominant7# " | 5₃ 5# 7₂ 2₄3 | 3 3 7 2₂ 3₃5# | 3 3 3 5#₂ 7₃2 | 3 3 5# 7₂ 2₄3 |
| Tonic " | 6 6 1 3 | 6 6 1 3 6 | 6 6 3 6 1 | 6 6 6 1 3 |

Witnesses: Inventor:
L. F. Schaefer Samuel B. Turner

UNITED STATES PATENT OFFICE.

SAMUEL B. TURNER, OF CHICAGO, ILLINOIS.

MECHANICAL MUSIC-CHART.

SPECIFICATION forming part of Letters Patent No. 684,960, dated October 22, 1901.

Application filed March 27, 1901. Serial No. 53,090. (No model.)

*To all whom it may concern:*

Be it known that I, SAMUEL B. TURNER, a citizen of the United States, residing at Chicago, in the county of Cook and State of Illinois, have invented certain new and useful Improvements in Mechanical Music-Charts, of which the following is a specification.

This invention relates to improvements in mechanical music-charts; and it consists in certain peculiarities of the construction, novel arrangement, and operation of the various parts thereof, as will be hereinafter more fully set forth and specifically claimed.

The principal objects of my invention are, first, to provide a mechanical music-chart which shall be simple in construction and operation, being especially arranged and designed for the piano, organ, and similar instruments; second, to provide such a chart which will illustrate and transpose the diatonic scale into different keys with the correct signatures belonging thereto, and, third, will show the relation between major and minor music, with the principal chords of each as commonly employed in piano and organ accompaniments.

Other objects and advantages of my invention will appear in the description hereinafter contained.

In order to enable others skilled in the art to which my invention pertains to make use of the same, I will now proceed to describe it, referring to the accompanying drawings, in which—

Figures 1 and 2 are views in front elevation of the chart, showing it ready for use in the key of G♭ major or its relative E♭ minor. Fig. 3 is a detached front view in elevation of a portion of the transposer, showing the double indicator, the loop, and also syllables and characters representing the diatonic scale and also showing the transposer made opaque in parts, as hereinafter explained. Fig. 4 is a cross-sectional view taken on line 4 4 of Fig. 1, showing the detailed construction of the device. Fig. 5 is an enlarged view in elevation of a portion of the device, showing it ready for use in the key of G major and its relative E minor. Fig. 6 represents a portion of the device with the transposer removed, showing the signatures, also words, letters, and characters of explanation located on the body or supporting-piece, said signatures, words, letters, and characters being partly hidden from view when the device is ready for use. Figs. 7 and 8 show words and characters representing major and minor scales, also major and minor accompaniments in the different positions, with the fingering belonging thereto, the whole to be placed on the front part of the chart, as illustrated in Figs. 1 and 2 of the drawings.

H represents the body of the chart, which in size should correspond with the keyboard of a piano or organ, but may be larger or smaller. This body or supporting-piece is usually rectangular in outline and may be made of any suitable material, but preferably of cardboard or other like material, and having printed or painted thereon a representation of the keyboard of a piano or organ, also signatures or marks of transposition and words, letters, and characters of explanation and also words and characters, as shown in Figs. 7 and 8 of the drawings. This body or supporting-piece is further provided with two openings $h$, through which a flexible loop $i$ is passed before being fastened to the ends of the transposer, said loop holding the transposer in position and helping to conceal the signatures, so that when the transposer is moved back and forth the double indicator $j$ and the words and characters on the transposer will be caused to register with the representation of the keyboard $k$, the signatures $l$, and the words and characters of explanation $m$, located on the body or supporting-piece, thus transposing the diatonic scale into the various keys and showing the relation between major and minor music.

The transposer I is made of transparent celluloid or other like material, said transposer being made opaque in parts by the application of paint or otherwise $n$, the paint being of a color corresponding with the device and applied on the opposite or farther side of the transposer in such manner as to leave a transparent space between for the display of the signatures. The transposer is also provided with a double indicator $j$, pointing to the relative or corresponding major and minor keys, as shown by the representation of the keyboard located on the body or supporting-piece. The horizontal line of numerals *o* and the corresponding line of syllables *p* will likewise register with the keys required to produce the diatonic scale.

The lower part of the device is provided with a piece of felt *q* or other soft material for the keys of the instrument to strike against to prevent rattling and to protect the keys.

While I have shown the chart arranged with a transparent transposer, the same being made opaque in parts and movably located in the front of the body or supporting-piece, yet I do not desire to limit myself to such arrangement, as I may obtain like results by making the transposer of opaque material, having a sight-opening for the display of the signatures, or I may construct the body or supporting-piece in such manner as to form a cavity for the operation of the loop *i*, thus presenting a plain surface on the back of the chart on which may be placed printed matter, or I may add to or omit from the front part of the body or supporting-piece chords, words, letters, or characters or add to or omit from the transposer words, syllables, or characters without departing from the spirit of my invention.

In using my mechanical music-chart I place it in an upright position over the keyboard of the piano, organ, or similar instrument, with the characters on its front surface plainly visible and with the keyboard represented thereon directly over the corresponding keys of the instrument.

When it is desired to play or accompany a piece of music written in the key of G♭ major or its relative E♭ minor, the transposer is slid toward the left or base until the corresponding signature appears, the signatures and characters of explanation not required in that key being hidden from view either by the loop *i* or by reason of the transparent transposer being made opaque in parts, as shown at *n* in Fig. 3 of the drawings. When it is desired to play in the key of G major or E minor, the transposer is slid toward the right or treble until the signature corresponding therewith is displayed, thus transposing what was previously shown in the key of G♭ major and E♭ minor into the key of G major and E minor.

From the foregoing it is evident that the remaining keys may be effected and transposed in like manner, the signatures and characters in all cases adjusting automatically, so as to correspond with the requirements of the key desired.

Having fully described my invention, what I claim as new, and desire to secure by Letters Patent, is—

1. In a mechanical music-chart, the combination with a body or supporting-piece, of a transposer movably connected therewith, said transposer being connected with a flexible loop the loop passing through two openings in the body or supporting-piece, substantially as described.

2. In a mechanical music-chart, the combination with a body or supporting-piece, of a transposer horizontally movably connected therewith, said body or supporting-piece having thereon a representation of the keyboard of a piano or organ and having two openings through which a flexible loop is passed connecting the transposer, said transposer having thereon a double indicator, substantially as described.

3. In a mechanical music-chart, the combination with a body or supporting-piece, of a transposer movably connected therewith, said body or supporting-piece having thereon signatures or marks of transposition, and also words, letters and characters of explanation and a representation of the keyboard of a piano or organ, said body or supporting-piece having two vertical openings through which a flexible loop is passed connecting the transposer, said transposer having thereon syllables or characters representing the diatonic scale, and also a double indicator, substantially as described.

SAMUEL B. TURNER.

Witnesses:
L. T. SCHAEFER,
LUCIUS TETER.